(12) United States Patent
Kinsinger et al.

(10) Patent No.: US 8,105,404 B2
(45) Date of Patent: Jan. 31, 2012

(54) BLAST MATERIAL

(75) Inventors: Daniel L. Kinsinger, Canton, OH (US); Vincent M. Librizzo, Commack, NY (US)

(73) Assignee: U.S. Technology Corporation, Canton, OH (US)

( * ) Notice: Subject to any disclaimer, the term of this patent is extended or adjusted under 35 U.S.C. 154(b) by 659 days.

(21) Appl. No.: 11/811,814

(22) Filed: Jun. 12, 2007

(65) Prior Publication Data
US 2008/0120917 A1    May 29, 2008

Related U.S. Application Data

(60) Provisional application No. 60/814,658, filed on Jun. 16, 2006.

(51) Int. Cl.
*B24D 3/02* (2006.01)
*C09C 1/68* (2006.01)
*C09K 3/14* (2006.01)

(52) U.S. Cl. .................. 51/307; 51/308; 51/309

(58) Field of Classification Search ........... 51/307–309; 451/38, 39
See application file for complete search history.

(56) References Cited

U.S. PATENT DOCUMENTS

| | | | |
|---|---|---|---|
| 5,363,603 A * | 11/1994 | Miller et al. | 451/40 |
| 5,376,157 A | 12/1994 | Yam et al. | |
| 5,439,493 A | 8/1995 | Kirschner | |
| 5,509,971 A | 4/1996 | Kirschner | |
| 5,591,064 A * | 1/1997 | Spears, Jr. | 451/2 |
| 5,637,030 A * | 6/1997 | Chopra et al. | 451/39 |
| 7,052,362 B2 * | 5/2006 | Lynn | 451/3 |

* cited by examiner

*Primary Examiner* — Anthony Green
*Assistant Examiner* — Pegah Parvini
(74) *Attorney, Agent, or Firm* — Sand & Sebolt

(57) ABSTRACT

A blast media for removal of thick coatings from heavy steel and lighter aluminum substrates where a profile is desired for new paint adhesion. The blast media is applied as a free flowing particulate in a stream of a pressurized fluid. The blast media comprises a main ingredient of a glass frit with smaller generally equal amounts by weight of angular copper slag, spherical synthetic iron oxide and aluminum oxide.

11 Claims, No Drawings

BLAST MATERIAL

CROSS REFERENCE TO RELATED APPLICATIONS

This application claims priority from U.S. Provisional Application Ser. No. 60/814,658 filed Jun. 16, 2006; the disclosure of which is incorporated herein by reference.

BACKGROUND OF THE INVENTION

1. Technical Field

The invention relates to a blast media and for the method of using the blast media for removing coatings such as paint, epoxy, polyurethane and similar materials from substrates. Even more particularly, the invention relates to a unique blast media formulation for removing coatings from aluminum and steel while preparing the underlying surface for subsequent new paint adhesion without damaging the surface.

2. Background Information

Various methods and blast media have been developed for stripping various types of coatings from an underlying metal substrate or composite substrate by various abrasives. These abrasives vary considerably in materials, sizes, grit, weight, etc., all of which are intended to achieve certain coating removal characteristics. These compositions contain particulates which are entrained in a pressurized fluid, generally air, and directed at predetermined pressures for impacting the particulates onto the coated surfaces for removing the coating therefrom without damaging the underlying surface.

It has been found that the removal of coatings on heavy steel substrates such as bridges, tanks, ships, etc. is more difficult than lighter coatings, especially where a subsequent profile is desired on the substrate for new paint adhesion. Also, it is desirable to be able to use a similar blast media for removing coatings from lighter substrates or surfaces such as aluminum, again without damaging the underlying surface and preparing the substrate for subsequent new paint adhesion. Some examples of prior art blast media and the method of using the media to strip coatings from substrates are found in U.S. Pat. Nos. 5,376,157, 5,439,493 and 5,509,971. These merely show various blast media formulations found suitable for certain applications.

The blast media of the present invention has been found to be extremely satisfactory for removing thick coatings on heavier steel substrates, as well as a less coarse blast media containing the same components as used in the more coarse blast media but in different percentages, for removing coatings from lighter substrates such as aluminum.

Prior art blast materials are usually designed to remove a certain type of coating from the substrate with other blast particles and materials being used to remove rust and corrosion from surfaces, that is, each of the particular blast components or particles are designed to achieve a certain end result. For example, one blast material removes the outer heavy coating and then another blast media is required to remove a thinner, intermediate coating and another media being used to remove rust and corrosion, with still another blast medium being used to prepare the surface for the subsequent adhesion of a new coating of paint. All of these require additional blasting steps, time and effort increasing the cost of a particular removal and surface preparation.

BRIEF SUMMARY OF THE INVENTION

One aspect of the present invention is to provide an improved blast material consisting of various percentages and ratios of four principal components, namely a glass frit, which is the major component of the mixture, with generally equal amounts of angular copper slag, spherical synthetic iron oxide and aluminum oxides.

Another feature of the present invention is to provide the blast media mixture with approximately 40% by weight of glass frit with the three remaining components, copper slag, iron oxide and aluminum oxide being each approximately 20% of the mixture by weight.

A further aspect of the present invention is to form a coarse blast media of the four major components for heavy coating removal and providing a desired subsequent profile to the surface, with the glass frit having a particle size range of approximately 10 to 30 mesh, wherein the copper slag has a particle size range of between 8 and 12 mesh, the iron oxide has a size range of between 12 and 40 mesh, and the aluminum oxide has a size range of between 20 and 35 mesh.

Still another feature of the invention is to provide for a more medium grade blast media in which the major glass frit component has a mesh size generally in the range of 20 to 40 mesh, the copper slag has a mesh size range of between 16 and 30 mesh, the iron oxide has a mesh size range of between 16 and 40 mesh and the aluminum oxide has a size range of between 60 and 100 mesh.

Another aspect of the present invention is to impinge the blast media against the substrate with a fluid pressure of between 35 psi and 120 psi, and which when used at a lower pressure range of between 35 psi and 80 psi can be recycled for reuse, and when used at a higher pressure range of between 100 psi and 120 psi, provides only a single use of the blast media.

Another feature of the present invention is to provide a blast media which contains a unique combination of materials, each of which performs a certain function when impinged against the surface being blasted by the blast materials. For example, the glass frit will remove the heavy outer coating from the substrate and will provide for preparing the profile of the substrate for the next application of a protective coating or paint, while simultaneously the copper slag and iron oxide will assist in the coating removal of other layers of paint etc., whereas the aluminum oxide, which is a softer material, will remove the rust and corrosion generally simultaneously with the removal of the heavier coating by the glass frit and the subsequent coating removal of the other thinner coatings by the copper slag and iron oxide.

DETAILED DESCRIPTION OF THE INVENTION

The blast media of the present invention includes four main components. The majority component is a glass frit with the other three minor components being an angular copper slag, a spherical synthetic iron oxide and an aluminum oxide. The blast media is designed for removal of thick and enhanced coatings on heavy steel substrates such as bridges, tanks, ships, etc. where a profile is desired for a subsequent new paint adhesion. It has been found that the blast media of the present invention will remove heavier enhanced coatings such as various epoxies, polyurethane, etc. at twice the strip rate of prior art media and is able to control the surface profile by adjusting the pressure or the size of the blast media. It has also been found that depending upon the application as described below, the blast media, if used at a sufficiently low pressure can be recycled, or if blasted at a higher pressure is used as a single shot blast media.

The blast media of the present invention preferably has several mixtures, and in particular a medium mixture and a coarse mixture, the particulars of which are set forth below.

The medium mixture is comprised of approximately 40% glass frit having a mesh size in the range of 20 to 40, with the copper slag, iron oxide and aluminum oxide preferably being of equal proportions, each forming approximately 20% by weight of the mixture. The copper slag has an approximate size range of between 16 and 30 mesh. The iron oxide having a size range of between 16 and 40 mesh and the aluminum oxide being approximately 80 grit, that is, a mesh size in the range of 60-100 mesh. The term "mesh" as used throughout refers to the U.S. mesh size of sieves.

The coarser blast material mixture uses approximately 40% glass frit with a mesh size of between 20 and 30, with the approximately equal amounts of copper slag, iron oxide and aluminum oxide. The copper slag has a mesh size in the range of between 8 and 12 mesh, the iron oxide has a mesh size in the range between 12 and 40, with the aluminum oxide being approximately a 30 grit, that is, having a mesh size in the range of 20 to 25 mesh. These mixtures provide the medium mixture with a mesh size of between 20 and 40 with the coarse mixture having a mesh size of between 10 and 40. Again, all mesh sizes are based upon the U.S. standard sieve. It is readily understood that these percentages and mesh size can vary slightly without material affecting the concept of the invention.

Depending upon the application, the blast media is applied by pressurized systems well known in the art, wherein the blast media particles are entrained in a stream of pressurized fluid, usually air. This stream is directed through various controlled nozzles which direct the stream of particles against the substrate at certain pressures. It has been found that the blast media of the present invention when applied at a lower pressure, for example between 35 psi and 80 psi, can be recycled up to five cycles, but when blasted at a higher pressure, for example between 100 psi to 120 psi, it is only a single shot media. It is readily understood that other pressures in-between these minimum and maximum pressures can be used for certain applications and can result in some recycling of the blast media.

The coarse media preferably is used to remove thick coatings on heavy steel substrates and preparing the surface of the steel substrate for subsequent new paint adhesive, whereas the medium mixture preferably is used for lighter steel substrates and aluminum substrates at a lower pressure for removing coatings thereon, and for preparing the surface for subsequent new paint adhesion.

As indicated above, the majority component of the formulation of the present invention is glass frit, preferably having a mesh size in the range of between 10 and 40 U.S. sieve mesh size. One type of glass frit is distributed by TriVitro Incorporated under the trademark Vitrogrit® having the specifications set forth in Table 1.

TABLE 1

| SPECIFICATIONS | |
|---|---|
| Specific Gravity | 2.50 |
| Density | Approx. 80 lbs/cu. ft. |
| Hardness | Approx. 6.0 (Mohs) |
| Conductivity | 73 micro-mho/cm |
| Chlorides | <.0002% |
| Shape | Angular to sub-angular |
| Embedment at 100 psi | 0.0% to 0.4% |
| Wt. Change on Ignition | −0.17% |
| Softening Point | Approx. 1350° F. |
| Typical Composition | |
| SiO2 - 73%; Na2O - 14%; CaO - 10%; MgO - <1%; Al2O3 - <1%; SO3 - <1% | |

Also as indicated above, one of the secondary ingredients is angular copper slag ranging in U.S. mesh size from 8 to 30.

One type of angular copper slag is distributed by Opta Minerals Inc. under the designation Ebony Grit 14 Special having the specifications set forth in Table 2.

TABLE 2

Technical Data Sheet
Ebony Grit Special is composed of ferrosilicate material (copper slag) and a naturally occurring mineral (Specular Hematite). This special composition is processed into a fast cutting abrasive product by Opta Minerals. The coarse, angular slag and the coarse, dense mineral particles make this low silica product an ideal economic alternative in many abrasive applications.

| Typical Chemical Analysis (%): | | |
|---|---|---|
| Iron Oxide | $Fe_2O_3$ | ~65.0 |
| Silicon Dioxide (total) | $SiO_2$ | ~24.0* |
| Aluminum Oxide | $AL_2O_3$ | ~4.0 |
| Calcium Oxide | CaO | ~2.5 |
| Zinc | Zn | ~2.0 |
| Magnesium Oxide | MgO | ~1.0 |
| Copper | Cu | ~1.0 |
| Loss on Ignition | LOI | <0.01 |

| Typical Physical Properties: | |
|---|---|
| Colour | Lustrous black |
| Bulk Density (loose) | 125 lbs./ft.$^3$ |
| Bulk Density (compacted) | 142 lbs./ft.$^3$ |
| Specific Gravity | ~4.1 |
| Moisture | <0.20% |
| Grain Shape | Angular |
| Moh Hardness | 7 |
| Knoop 100 Hardness | ~6500 |
| Melting Point | na |
| Solubility | Insoluble |
| Typical Gradation: Standard | 12/40 |

*Analysis of raw materials demonstrate that >99.5% of the $SiO_2$ is physically bound as Fayalite ($Fe_2SiO_4$).
Respirable Silica-Quartz None
Respirable Silica-Cristobalite None This copper slag also is referred to as a crystalline ferric oxide and is detailed by Reade Advanced Materials as set forth in Table 3.

TABLE 3

Synonyms:

Crystalline ferric oxide, specular hematite, fe2O3, specular red iron oxide, specularite, Alaska black diamond, specular jeweler's rouge
Formula:

$Fe_2O_3$
Description:

A purified, naturally occurring mineral called specular hematite (Fe2O3). It a blocky, heavy iron-based crystal and the most stable form of ferric oxide in a fully crystalline state. The product will not rust or oxidize as its crystalline composition makes it a stable form of ferric oxide (Fe2O3). No rust means it will not stain or clog metering valves. It is non-hygroscopic and will not absorb moisture. It is non-magnetic and will not stick to steel due to magnetic attraction, but it has a very weak susceptibility to magnetic forces.
Typical Chemical Properties Available:

Composition of ore: Iron = 70%, Oxygen = 30%, and Crystalline silica = 0.5% max.
Typical Physical Properties Available:

Lumps, granules, 10 × 20 mesh, 12 × 50 mesh, and various powder granulations custom size reduced down to ~1 micron

| Nominal Physical Constants | |
|---|---|
| Chlorides | 0.00076% |
| Free Flow | 99.96% |
| Bulk Density (lbs./ft.$^3$) | 183 |
| Melting Point (° C.) | 1390 |

TABLE 3-continued

| | |
|---|---|
| Conductivity (micromhos/cm) | 38 |
| Oil Content | 0.0% |
| Weight Changes On Ignition | +0.04% |
| Mohs Hardness (80% minimum) | 6 to 7.5 |
| Specific Surface Area (m$^2$/g) | |
| Specific Gravity | 5.29 |
| Color | Steel gray |
| Crystallography | Angular & uniform |

One type of aluminum oxide found satisfactory for the blast media of the present invention is aluminum oxide power having the formula Al$_2$V$_3$ and is a fused chemically stable compound that is resistant to most acids as well as chemical effects caused by gases. It has typical physical properties of sintered pieces, targets, single crystals, tumbling media (1½"×2" down to 24×240 mesh), coarse grit, hollow bubbles, fine powder, in a colloidal dispersion, and nanoparticles. Its nominal physical constants are set forth on Table 4 below. As previously indicated, this material has a grit size in the range of between 30 and 80, namely a mesh size between 20 and 100.

TABLE 4

Aluminum Oxide Nominal Physical Constants

| | |
|---|---|
| Molecular Weight (g/mol.) | 000 |
| Apparent Density (g/cm$^3$) | 3.4-3.9 |
| Bulk Density (g/cm$^3$) | |
| Melting Point (° C.) | 2072 |
| Boiling Point (° C.) | 2980 |
| Specific Surface Area (m$^2$/g) | |
| Thermal Conductivity (cal/s-cm-° C.) | 1500-1900 |
| Mohs Hardness @20° C. | 9.0 |
| Particle Shape | irregular & sharp edged |
| Specific Gravity | 3.78-3.94 |
| Apparent Porosity | 2.5-3.94 |
| pH | 7.0-9.5 |

Also, as discussed above, the fourth ingredient is an iron oxide which is supplied in approximately equal amounts by weight to that of the copper slag and aluminum oxide. This iron oxide has a mesh range between 12 and 40 with one example being a synthetic black iron oxide being distributed by PEL Technologies, LLC which is a mixture of spherical and/or angular black particles composed of a mixture of ferrite spinel, predominantly magnetite Fe$_3$O$_4$, plus associated oxide phases. It has the physical and chemical properties set forth in Table 5 below.

TABLE 5

Physical and Chemical Data

| | | | |
|---|---|---|---|
| Formula: | Fe—Fe$_2$O$_4$ | Mol. Wt.: | 231.50 |
| Melting Point: | 1595 C. | Density: | 5-5.2 g/cc |
| Water Solubility (%): | negligible | % volatile by volume: | 0 |

The coarse mixture described above will have an average size of between 10 and 40 mesh, with the medium mixture having an average size of between 20 and 40 mesh. The average hardness of both mixtures will be approximately 7.0 Mohs with a bulk density of 118.5 lbs/ft$^3$, and is described as a silica-free dense particle mineral adhesive.

Although the above describes various formulations for achieving the end result, one of the main features of the invention is that each of the particular blast materials, which are combined in the manner set forth above, is intended to achieve a certain result and perform a certain function. For example, the primary function of the glass frit is that it will remove the heavy coatings of a substrate and subsequently assist in profiling the stripped surface preparing it for the application of a new protective coating. The copper slag and iron oxide will assist in coating removal or other types of coatings whereas the aluminum oxide being a softer material will assist in the removal of rust and corrosion simultaneously with or just after removal of the heavy and intermediate coatings from the substrate by the glass frit, copper slag and iron oxide. Thus, the single blast material of the present invention provides for a plurality of different particles which act together to clean a surface and prepare it for the subsequent addition of a new protective coating such as paint, wherein each of the individual materials performs a certain function in the cleaning process in a single blast application eliminating the use of several blast particles in several applications as heretofore required.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A blast media for removing coatings from a hard surface comprising:
    glass frit in an amount of approximately 40% by weight of the blast media, and copper slag, iron oxide, and aluminum oxide, each in an amount of approximately 20% by weight of the blast media.

2. The blast media defined in claim 1 wherein the glass frit has a size range of approximately 10 to 30 mesh.

3. The blast media defined in claim 1 wherein the copper slag has a size range of approximately 8 to 30 mesh.

4. The blast media defined in claim 1 wherein the iron oxide has a size range of approximately 12 to 40 mesh.

5. The blast media defined in claim 1 wherein the aluminum oxide has a size range of approximately 20 to 100 mesh.

6. The blast media defined in claim 1 wherein
    the glass frit has a size range of approximately 20 to 30 mesh;
    the copper slag has a size range of approximately 8 to 12 mesh;
    the iron oxide has a size range of approximately 12 to 40 mesh; and
    the aluminum oxide has a size range of approximately 20 to 25 mesh.

7. The blast media defined in claim 1 wherein
    the glass frit has a size range of approximately 20 to 40 mesh;
    the copper slag has a size range of approximately 16 to 30 mesh;
    the iron oxide has a size range of approximately 16 to 40 mesh;
    and the aluminum oxide is approximately 60 to 100 mesh.

8. The blast media defined in claim 1 wherein the blast media has a bulk density of approximately 118.5 lbs/ft$^3$.

9. The blast media defined in claim 1 wherein the blast media has an average hardness of 7.0 Mohs.

10. The blast media defined in claim 1 wherein the iron oxide is a spherical synthetic iron oxide.

11. The blast media defined in claim 1 wherein the copper slag is composed of ferrosilicate material and specular hermatite.

* * * * *

UNITED STATES PATENT AND TRADEMARK OFFICE
CERTIFICATE OF CORRECTION

PATENT NO. : 8,105,404 B2
APPLICATION NO. : 11/811814
DATED : January 31, 2012
INVENTOR(S) : Daniel L. Kinsinger et al.

It is certified that error appears in the above-identified patent and that said Letters Patent is hereby corrected as shown below:

Column 6, lines 63-64 (Claim 11), "hermatite" should be changed to --hematite--

Signed and Sealed this
Twenty-seventh Day of March, 2012

David J. Kappos
*Director of the United States Patent and Trademark Office*